(12) United States Patent
Radic

(10) Patent No.: US 10,804,805 B1
(45) Date of Patent: Oct. 13, 2020

(54) QUASI-RESONANT AUTO-TUNING CONTROLLER

(71) Applicant: Silanna Asia Pte Ltd, Singapore (SG)

(72) Inventor: Aleksandar Radic, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/663,626

(22) Filed: Oct. 25, 2019

Related U.S. Application Data

(60) Provisional application No. 62/833,076, filed on Apr. 12, 2019.

(51) Int. Cl.
*H02M 3/335* (2006.01)
*H02M 7/48* (2007.01)

(52) U.S. Cl.
CPC ......... *H02M 3/33507* (2013.01); *H02M 7/48* (2013.01); *H02M 2007/4818* (2013.01)

(58) Field of Classification Search
CPC ......... H02M 3/33576; H02M 3/33592; H02M 3/33553; H02M 3/33507; H02M 7/48; H02M 2007/4818
See application file for complete search history.

(56) References Cited

U.S. PATENT DOCUMENTS

| | | | |
|---|---|---|---|
| 5,304,917 A | 4/1994 | Somerville | |
| 2008/0037294 A1 | 2/2008 | Silva et al. | |
| 2010/0165672 A1 | 7/2010 | Li et al. | |
| 2014/0085943 A1* | 3/2014 | Lin | H02M 3/33507 363/21.17 |
| 2014/0246988 A1 | 9/2014 | Chen | |
| 2018/0316270 A1 | 11/2018 | Radic et al. | |
| 2018/0351465 A1 | 12/2018 | Cannenterre et al. | |

FOREIGN PATENT DOCUMENTS

| | | |
|---|---|---|
| CN | 107431434 A | 12/2017 |
| JP | 2002262570 A | 9/2002 |

OTHER PUBLICATIONS

LM5023_AC-DC Quasi-Resonant Current Mode PWM Controller, Texas Instruments, SNVS96E—Apr. 2013—Revised Jan. 2016.
International Search Report dated Jul. 17, 2020 for PCT Patent Application No. PCT/IB2020/053326.

\* cited by examiner

*Primary Examiner* — Adolf D Berhane
*Assistant Examiner* — Afework S Demisse
(74) *Attorney, Agent, or Firm* — MLO, a professional corp.

(57) ABSTRACT

A quasi-resonant auto-tuning controller includes a zero-voltage crossing detection circuit and a valley tuning finite-state machine having a look-up table. The zero-voltage crossing detection circuit receives a reference voltage and receives an auxiliary signal from an auxiliary winding. The zero-voltage crossing detection circuit produces a comparison signal having pulses when the auxiliary signal is less than the reference voltage. The valley tuning finite-state machine produces a divided pulse width based on the comparison signal, stores the divided pulse width of each pulse in the look-up table, determines, from the comparison signal, that the auxiliary signal is less than the reference voltage, waits a time period corresponding to the divided pulse width stored in the look-up table if the auxiliary signal is less than the reference voltage, and produces a valley point signal after waiting the time period.

23 Claims, 4 Drawing Sheets

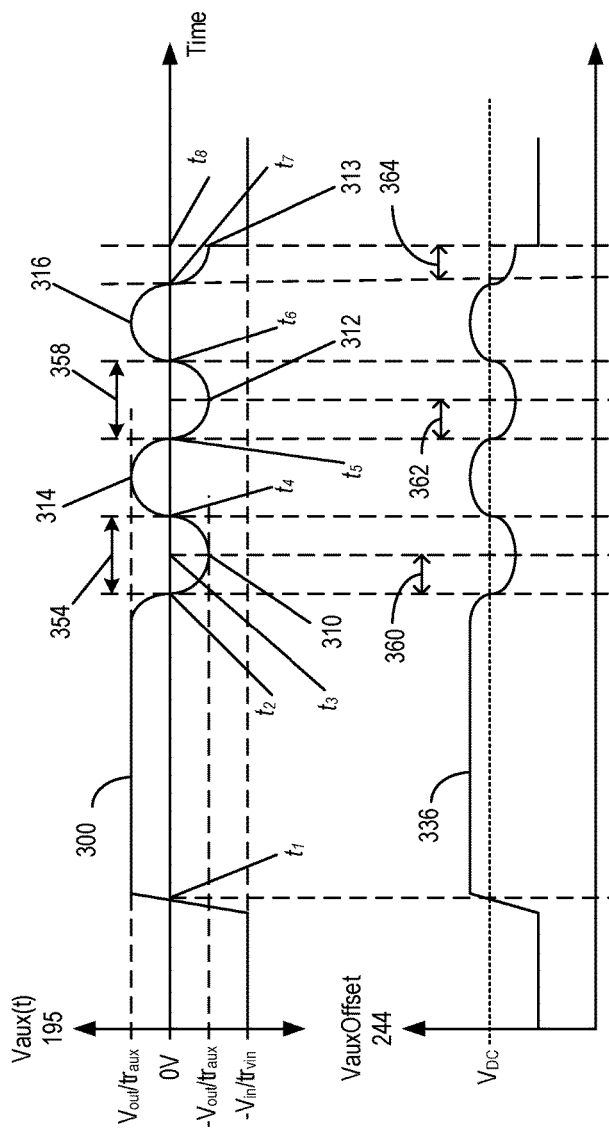
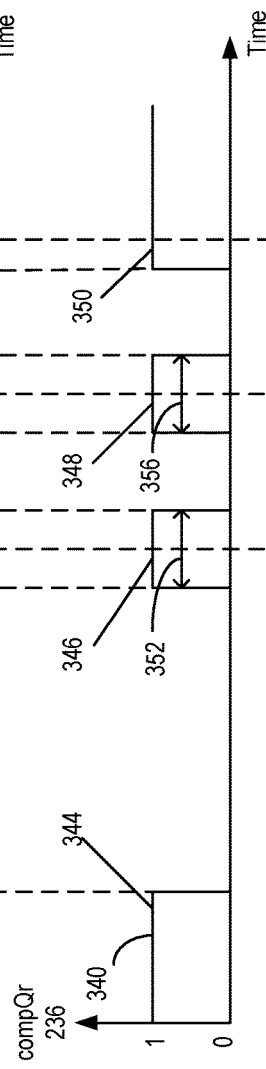
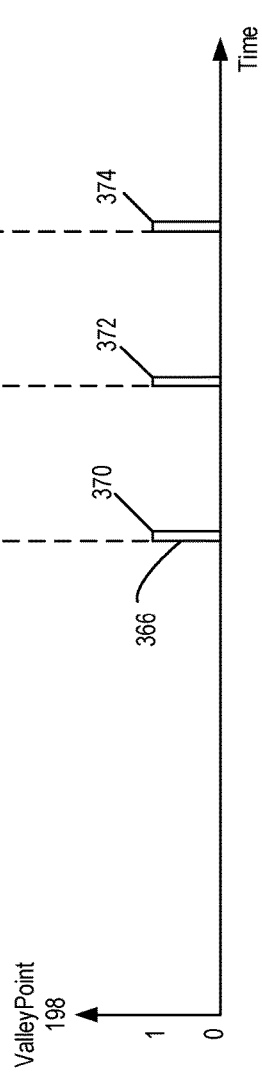
FIG. 3A
FIG. 3B
FIG. 3C
FIG. 3D

QUASI-RESONANT AUTO-TUNING CONTROLLER

CROSS-REFERENCE TO RELATED APPLICATION

This application claims the benefit of priority to U.S. Provisional Application No. 62/833,076, filed Apr. 12, 2019, all of which is incorporated by reference herein in its entirety.

BACKGROUND

Flyback converters are common in modern power supplies and are utilized in both alternating current ("AC") to direct current ("DC") conversion, and DC-to-DC conversion with galvanic isolation between the input and outputs of the power supply. In general, a flyback converter is a power converter having an inductive device that is split to form a transformer which provides the galvanic isolation. In general, a flyback converter has a primary-side and secondary-side, where the primary-side of the flyback converter includes a switch (such as, for example, a transistor) and the secondary-side includes another switch (such as, for example, a diode) to rectify the current produced by the secondary-side of the flyback converter. In operation, flyback converters generally operate in a switched mode that periodically turns on and off the primary-side switch ("main switch") that supplies current to the inductive device.

In general, power losses in a flyback converter may include conduction losses, as well as switching losses. Such power losses may reduce the efficiency of the flyback converter, and in turn, generate heat that causes the temperature of the flyback converter to approach and/or exceed the peak operating temperature for the flyback converter. Consequently, power losses in the flyback converter may adversely affect the efficient and/or safe operation of the flyback converter. To mitigate some of such power losses, flyback converters may be operated in a quasi-resonant switching mode to reduce switching losses at the main switch and resultantly increase the efficiency of the flyback converter and lower the operating temperature of the main switch.

A quasi-resonant oscillating signal produced by inductances and parasitic capacitances of the flyback converter generally includes peaks (local voltage maxima) and valleys (local voltage minima), the valleys corresponding to times when the drain voltage of the main switch is a minimum value. Generally, quasi-resonant switching flyback converters use a controller device or circuit to control the operation of the switches so as minimize switching losses by turning the switches on when valleys are present in a quasi-resonant signal.

SUMMARY

In some embodiments, a quasi-resonant auto-tuning controller includes a zero-voltage crossing detection circuit and a valley tuning finite-state machine having a look-up table. The zero-voltage crossing detection circuit is configured to receive a reference voltage and to receive an auxiliary signal from an auxiliary winding. The auxiliary signal includes multiple oscillation ripples, and each oscillation ripple of the multiple oscillation ripples has a peak point and valley point. The zero-voltage crossing detection circuit produces a comparison signal that includes multiple pulses when the auxiliary signal is less than the reference voltage. Each pulse of the multiple pulses has a pulse width that corresponds to a half-period of an oscillation ripple of the multiple oscillation ripples. The valley tuning finite-state machine is configured to determine the pulse width of each pulse of the multiple pulses of the comparison signal and produce a divided pulse width from each pulse width. The divided pulse width corresponds to a quarter-period of the oscillation ripple. The valley tuning finite-state machine stores the divided pulse width of each pulse in the look-up table, and determines, from the comparison signal, that the auxiliary signal is less than the reference voltage. The valley tuning finite-state machine waits a time period that corresponds to the divided pulse width stored in the look-up table if the auxiliary signal is less than the reference voltage and produces a valley point signal after waiting the time period.

In some embodiments, a method involves receiving a reference voltage and receiving an auxiliary signal from an auxiliary winding of a flyback converter. The auxiliary signal includes multiple oscillation ripples. Each oscillation ripple of the multiple oscillation ripples has a peak point and valley point. A comparison signal is produced, the comparison signal including multiple pulses when the auxiliary signal is less than the reference voltage. Each pulse of the multiple pulses has a pulse width that corresponds to a half-period of an oscillation ripple of the multiple oscillation ripples. The pulse width of each pulse of the multiple pulses of the comparison signal is determined. A divided pulse width is produced from each pulse width, the divided pulse width corresponding to a quarter-period of the oscillation ripple. The divided pulse width of each pulse is stored in a look-up table. The method further involves determining, from the comparison signal, that the auxiliary signal is less than the reference voltage and waiting a time period that corresponds to the divided pulse width stored in the look-up table if the auxiliary signal is less than the reference voltage. A valley point signal is produced after waiting the time period.

In some embodiments, a primary-side controller of a flyback converter having a main switch includes a quasi-resonant auto-tuning controller in signal communication with an auxiliary winding. The quasi-resonant auto-tuning controller is configured to produce a valley point signal from an auxiliary signal produced by the auxiliary winding. A mixed-signal controller is in signal communication with the quasi-resonant auto-tuning controller. The mixed-signal controller is configured to receive the valley point signal and, in response, produce a pulse width modulated ("PWM") signal. A gate-driver drives the main switch and is in signal communication with the main switch and mixed-signal controller. The gate-driver is configured to receive the PWM signal and produce a gate-driver signal.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE DRAWINGS

The disclosure may be better understood by referring to the following figures. In the figures, like reference numerals designate corresponding parts throughout the different views.

FIG. 3A is a plot of an example auxiliary signal produced by the auxiliary-winding, shown in FIG. 1, in accordance with the present disclosure.

FIG. 3B is a plot of an example offset auxiliary signal produced by the zero-voltage crossing detection circuit, shown in FIG. 2, in accordance with the present disclosure.

FIG. 3C is a plot of an example comparison signal produced by the zero-voltage crossing detection circuit, shown in FIG. 2, in accordance with the present disclosure.

FIG. 3D is a plot of an example valley point signal produced by the quasi-resonant auto-tuning controller, shown in FIGS. 1 and 2, in accordance with the present disclosure.

DETAILED DESCRIPTION

Figure 1:
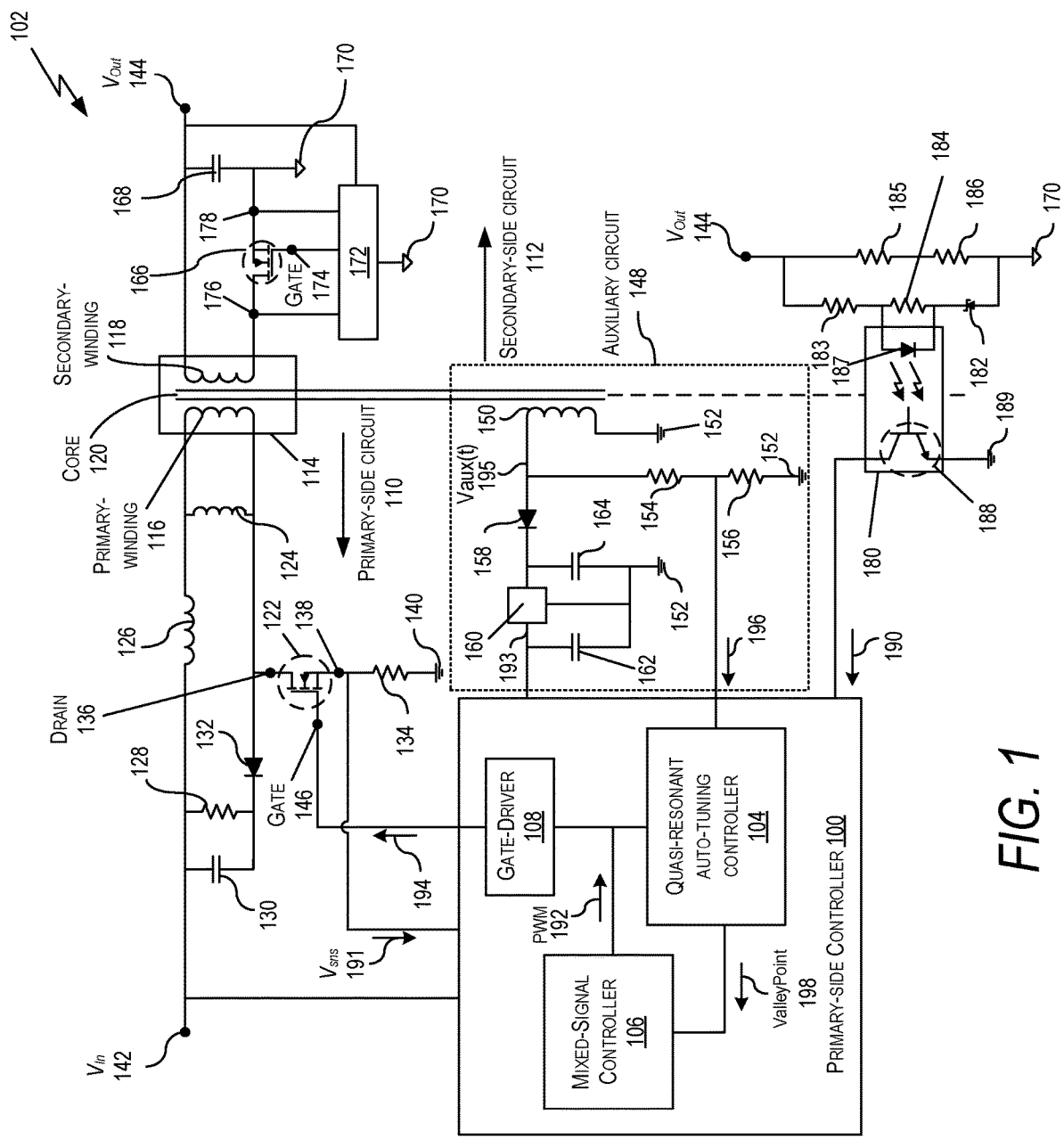
FIG. 1 is a schematic diagram of an example flyback converter, in accordance with the present disclosure.

In the following description, like reference numbers are used to identify like elements. Furthermore, the drawings are intended to illustrate major features of example embodiments in a diagrammatic manner. The drawings are not intended to depict every feature of actual embodiments.

Disclosed herein is a quasi-resonant auto-tuning controller of a flyback converter for accurate detection of voltage valley points during quasi-resonant operation across a wide range of input voltages (for example, between 85 to 265 volts), across a wide range of output voltages (for example, between 3 to 24 volts), and across a wide range of output load current operating conditions.

Accurate detection of voltage valley points (i.e., local voltage minima) of a quasi-resonant signal is often desirable for quasi-resonant operation in a flyback converter. This is because during quasi-resonant operation of the flyback converter, a primary-side switch ("main switch") of the flyback converter is ideally switched when a drain voltage of the main switch is at a minimum. Switching the main switch when a drain voltage of the switch is at a minimum improves power processing efficiency, reduces voltage stress across semiconductor switches, and reduces electromagnetic interference. However, at present it is often difficult to accurately detect main switch drain voltage valley points of a flyback converter operating in quasi-resonant conduction mode across a wide range of flyback converter input voltages (for example, from 85 VAC to 265 VAC), output voltages (for example, from 3 VDC to 24 VDC), and across varying output loads.

Some known related approaches typically require manual tuning by utilizing external components. Such known approaches are sensitive to quasi-resonant period variations due to variations in the input and output voltages of the flyback converter.

In order to accurately turn-on the main switch at a valley point across varying input and output conditions, and in the presence of system delays such as gate-driver propagation, valley detector conversion and processing delays, and a variable quasi-resonant period (for example, between approximately 800 ns to 2500 ns), an adaptive/predictive valley detection method is disclosed herein.

As a result of accurately detecting the voltage valley points, the quasi-resonant auto-tuning controller allows for optimal implementation of quasi-resonant operation of the flyback converter by switching the main switch of the flyback converter when the drain voltage of the main switch is minimum. Resultantly, the quasi-resonant auto-tuning controller allows for improved AC-to-DC power conversion efficiency, reduced voltage stress across semiconductor switches, and reduced electromagnetic interference. Moreover, the quasi-resonant auto-tuning controller accomplishes these goals without the need for manual tuning of external components or sensitivity to quasi-resonant period variations.

In general, the principle of operation of the quasi-resonant auto-tuning controller involves measuring a half-period of the multiple oscillation ripples of a quasi-resonant signal using an auxiliary signal produced by an auxiliary winding of the flyback converter. The half-period is measured using a zero-voltage crossing detection circuit of a primary-side controller. The detected quasi-resonant half-periods are converted to quarter-periods (i.e., divided pulse widths) and stored in a look-up table (LUT) (e.g., in a memory device). In this example, each quarter-period of the oscillation ripples corresponds to valley points (i.e., a first valley point, a second valley point, a third valley point, etc.) of the oscillation ripples. During a subsequent switching cycle of the flyback converter, when the quasi-resonant auto-tuning controller detects a zero-voltage crossing for a desired valley at which to switch (i.e., at a first valley, a second valley, a third valley, etc.), the quasi-resonant auto-tuning controller waits for a measured one quarter-period before producing a valley point signal that represents an estimated valley point of the corresponding oscillation ripple of the auxiliary signal (i.e., the quasi-resonant signal). If the flyback converter is exclusively switching at a first valley of the quasi-resonant signal, it may not be possible for the quasi-resonant auto-tuning controller to measure a full quasi-resonant half-period. Thus, in some examples, if the quasi-resonant auto-tuning controller determines that the main switch of the flyback converter has been exclusively switching at a first valley point of the quasi-resonant signal for a threshold number of previous switching cycles of the flyback converter, the quasi-resonant auto-tuning controller is operable to force the flyback converter to switch at a second (or later) valley point of the quasi-resonant signal for one or more subsequent switching cycles periodically to measure the quasi-resonant half-period. For example, the quasi-resonant auto-tuning controller may force the flyback converter to switch at the second valley point of the quasi-resonant signal for one or more switching cycles once every 255 switching cycles upon determining that flyback converter has been switching exclusively at the first valley point of the quasi-resonant signal for the preceding 255 switching cycles.

Turning to FIG. 1, a schematic diagram is shown of an example implementation of a primary-side controller 100 of a flyback converter 102, in accordance with the present disclosure. In operation, the flyback converter 102 receives an input voltage ("$V_{In}$") 142 and produces an output voltage ("$V_{Out}$") 144. In this example, the primary-side controller 100 includes a quasi-resonant auto-tuning controller 104, a mixed-signal controller 106, and a gate-driver 108. The mixed-signal controller 106 is in signal communication with both the quasi-resonant auto-tuning controller 104 and the gate-driver 108.

In this example, the flyback converter 102 includes a primary-side circuit 110, a secondary-side circuit 112, and an auxiliary circuit 148. The auxiliary circuit 148 generally includes an auxiliary-winding 150 of a transformer 114, an auxiliary ground 152, a first voltage divider resistor 154, a second voltage divider resistor 156, a series diode 158, a voltage regulator (e.g., an LDO) 160, and capacitors 162, 164. The primary-side circuit 110 and secondary-side circuit 112 are in signal communication via the transformer 114 having a primary-winding 116, a secondary-winding 118, the auxiliary-winding 150, and a core 120. The primary-winding 116 is part of the primary-side circuit 110, and the secondary-winding 118 is part of the secondary-side circuit 112. The primary-side circuit 110 includes the main switch 122, a current-sense resistor 134, and a snubber circuit which includes a resistor 128, a capacitor 130, and a diode 132. Also shown is a representation of a magnetizing inductance 124 and a representation of a parasitic inductance 126 of the transformer 114. The primary-winding 116, the capacitor 130, and the diode 132 are in signal communication with a drain 136 of the main switch 122. The current-sense resistor 134 is in signal communication with a source 138 of the main switch 122 and a primary-side ground 140. In this example, the main switch 122 is a field-effect transistor ("FET") that may be a metal-oxide semiconductor field-effect transistor ("MOSFET").

The primary-side controller 100 is in signal communication with the auxiliary circuit 148, the main switch 122, and the voltage input of the primary-side circuit 110. In particular, a gate 146 of the main switch 122 is in signal communication with the gate-driver 108. The primary-side controller 100 receives the input voltage $V_{In}$ 142, a voltage $V_{sns}$ 191 that is representative of a current through the main switch 122, a feedback signal 190, an operating voltage 193, and an auxiliary signal 196 from the auxiliary-winding 150. The primary-side controller 100 is in signal communication with the voltage regulator 160 to receive the operating voltage 193 and the voltage divider resistors 154 and 156 to receive the auxiliary signal 196.

The primary-side controller 100 is also in signal communication with an optocoupler 180. In this example, feedback from the secondary-side circuit 112 to the primary-side circuit 110 is provided by the optocoupler 180 in combination with a Zener diode 182 and a resistive network that includes first, second, third, and fourth resistors 183, 184, 185, and 186, respectively. The optocoupler 180 includes an LED 187 and a phototransistor 188. The phototransistor 188 is in signal communication with the primary-side controller 100 and ground 189. In operation, the optocoupler 180 provides a feedback signal 190 to the primary-side controller 100 that indicates whether more or less power needs to be transferred from the primary-side circuit 110 to the secondary-side circuit 112 through the transformer 114.

The secondary-side circuit 112 includes the secondary-winding 118, a secondary-side switch 166, a capacitor 168, secondary-side ground 170, and a secondary-side controller 172. The secondary-side controller 172 is in signal communication with a gate 174, drain 176, and source 178 of the secondary-side switch 166 and the secondary-side ground 170. In this example, the secondary-side switch 166 may also be a FET such as a MOSFET. The secondary-side controller 172 is also configured to receive $V_{Out}$ 144.

In an example of operation, the mixed-signal controller 106 controls the operation of the main switch 122 by producing a pulse width modulated ("PWM") signal 192 that is passed to the gate-driver 108. The PWM signal 192 is received by the gate-driver 108 and converted into a driving voltage signal 194 that is injected into the gate 146 of the main switch 122 and turns on or off the main switch 122. A sequence of turning on the main switch 122 and turning off the main switch 122 is considered to be a switching cycle of the flyback converter 102. The gate-driver 108 may be a circuit, device, or component that includes circuitry to convert the PWM signal 192, which is a digital signal, to the driving voltage signal 194 capable of driving the main switch 122. In this example, the PWM signal 192 is also passed to the quasi-resonant auto-tuning controller 104. The quasi-resonant auto-tuning controller 104 utilizes the PWM signal 192 as a valley detection reset trigger. The quasi-resonant auto-tuning controller 104 receives the auxiliary signal 196 from the auxiliary-winding 150 through the voltage divider resistors 154 and 156. In response, the quasi-resonant auto-tuning controller 104 produces a valley point signal 198 (i.e., a signal indicating that a valley has occurred) that is passed to the mixed-signal controller 106. The mixed-signal controller 106 then utilizes the valley point signal 198 to determine when the main switch 122 should be switched. It is appreciated by those of ordinary skill in the art that in designing a switched-mode power supply, designers seek to maximize efficiency of the switched-mode power supply by attempting to switch the main switch 122 when a voltage between the drain and the source ("$V_{DS}$") is at a voltage valley (i.e., at a minimum voltage level). As such, the mixed-signal controller 106 optimizes a switching time of the main switch 122 to occur at a valley point.

Figure 2:
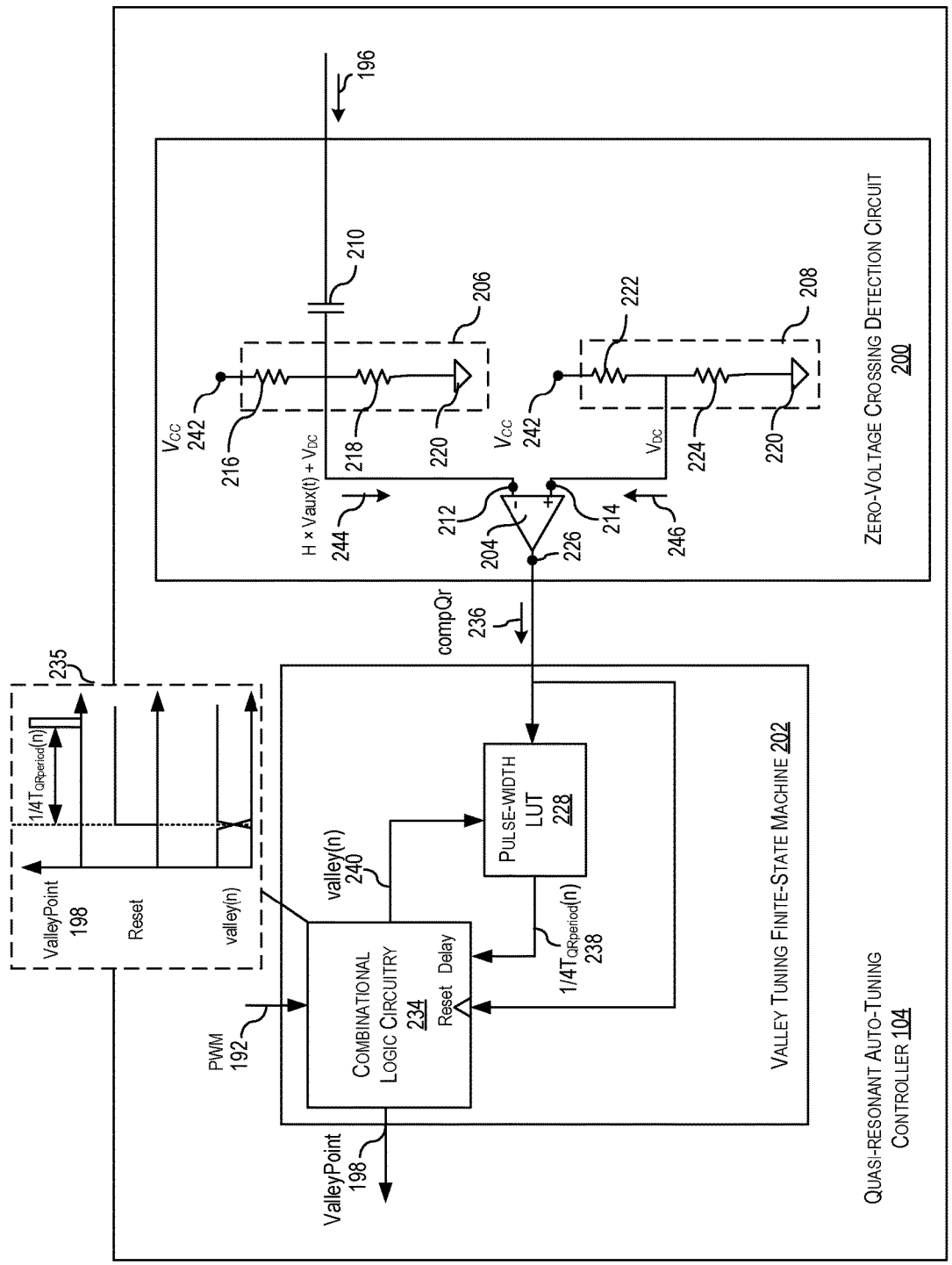
FIG. 2 is a schematic diagram of an example quasi-resonant auto-tuning controller shown in FIG. 1, in accordance with the present disclosure.

In FIG. 2, a schematic diagram is shown of an example of an implementation of the quasi-resonant auto-tuning controller 104, in accordance with the present disclosure. In this example, the quasi-resonant auto-tuning controller 104 includes a zero-voltage crossing detection circuit 200 in signal communication with a valley tuning finite-state machine 202. The zero-voltage crossing detection circuit 200 includes a comparison circuit 204, a first voltage divider network 206, a second voltage divider network 208, and a series capacitor 210. The comparison circuit 204 may be implemented as an operational amplifier ("op-amp") that includes an inverting terminal 212 and a non-inverting terminal 214. The first voltage divider network 206 includes voltage divider resistors 216, 218 coupled to a ground node 220. The second voltage divider network 208 includes voltage divider resistors 222, 224 coupled to the ground node 220. In this example, the voltage divider resistors 216, 218 of the first voltage divider network 206 and the series capacitor 210 are in signal communication with the inverting terminal 212 of the comparison circuit 204. The voltage divider resistors 222, 224 of the second voltage divider network 208 are in signal communication with the non-inverting terminal 214 of the comparison circuit 204. An output terminal 226 of the comparison circuit 204 is in signal communication with the valley tuning finite-state machine 202.

The valley tuning finite-state machine 202 is a finite-state machine (also known as a "state machine") which is a device that can be in exactly one of a finite number of states at any given time. A finite-state machine may change from one state to another in response to external inputs and is defined by a list of its states, its initial state, and the conditions for each transition (i.e., the change from one state to another). The valley tuning finite-state machine 202 may be implemented as a digital circuit that may include a programmable logic device, programmable logic controller, logic gates and flip-flops or relays. As an example, the valley tuning finite-state machine 202 may include a register to store state variables, a block of combinational logic that determines the state transitions, and a second block of combinational logic that determines the output of the valley tuning finite-state machine 202.

In this example, the valley tuning finite-state machine 202 includes a pulse-width look-up table ("LUT") 228, and combinational logic circuitry ("logic circuit") 234, connected as shown. A simplified example operational view 235 of the combinational logic circuitry 234 is also shown to illustrate generation of the valley point signal ("ValleyPoint") 198.

At a high level, the valley tuning finite-state machine 202 measures a duration of a half-period of a quasi-resonant waveform present at a drain node of the main switch 122 of the flyback converter 102. The valley tuning finite-state machine 202 uses the measured half-period (i.e., a half-pulse width) to determine a quarter-period (i.e., a divided pulse width) $\frac{1}{4}T_{QRperiod}(n)$ of the quasi-resonant waveform (e.g., using a divider circuit), and stores each duration corresponding to the quarter-period in the pulse-width LUT 228. The next time that a zero crossing of the quasi-resonant waveform is detected, (i.e., during a subsequent switching cycle of the flyback converter 102), the valley tuning finite-state machine 202 waits for a duration of time ($\frac{1}{4}T_{QRperiod}(n)$) corresponding to a stored duration in the pulse-width LUT 228 (i.e., a duration corresponding to a previously determined quarter-period) before issuing a valley point signal. The valley point signal (ValleyPoint 198) is used by the mixed-signal controller 106 to control a switching time for the main switch 122 such that a voltage at the drain node of the main switch 122 is at a voltage minimum corresponding to a desired valley of the quasi-resonant waveform. For example, if during a subsequent switching cycle, upon determining that a zero-crossing corresponding to a desired valley at which to switch (e.g., a first valley, a second valley, a third valley, etc.) has occurred, the valley tuning finite-state machine 202 waits a duration of time corresponding to the determined valley point before issuing a valley point signal (ValleyPoint 198).

In this example, the pulse-width LUT 228 is a look-up table within a memory module, programmable logic circuit, or another component. The logic circuit 234 is operable to determine a pulse width (e.g., using a counter circuit block), divide the determined pulse width (e.g., using a divider circuit block), generate a delayed pulse (e.g., using a delay circuit block), as well as being operable to perform other operations.

For example, the logic circuit 234 is operable to count a length of time that corresponds to the pulse width of each pulse of the multiple pulses of a comparison signal ("compQr") 236 produced by the comparison circuit 204.

During operation of the flyback converter 102, an induced current develops at the auxiliary-winding 150, thereby producing an auxiliary voltage Vaux(t) 195 across the auxiliary-winding 150. The auxiliary voltage Vaux(t) 195 is divided down by the voltage divider resistors 154, 156 (shown in FIG. 1) to produce an auxiliary signal 196 which is received by the zero-voltage crossing detection circuit 200. The series capacitor 210 (shown in FIG. 2) eliminates any DC component of the auxiliary signal 196. The first voltage divider network 206 offsets the remaining AC component of the auxiliary signal 196 with a DC component produced from a source voltage ("$V_{CC}$") 242 (e.g., the operating voltage 193) to produce an offset auxiliary signal 244 that is passed to the inverting terminal 212 of the comparison circuit 204. The offset auxiliary signal 244 ("VauxOffset") can be expressed as;

$$VauxOffset = H \times Vaux(t) + V_{DC} \qquad \text{Equation 1)}$$

where H is a scalar produced by the voltage divider resistors 154,156 and 216, 218, Vaux(t) is the auxiliary voltage Vaux(t) 195 generated by the auxiliary-winding 150, and $V_{DC}$ is an offset voltage generated by dividing $V_{CC}$ 242 by the first voltage divider network 206. The resultant offset auxiliary signal VauxOffset 244 is received at the inverting terminal 212 of the comparison circuit 204.

The second voltage divider network 208 divides $V_{CC}$ 242 by voltage divider resistors 222, 224 to generate a comparison reference signal 246 having the DC voltage value $V_{DC}$. The comparison reference signal 246 is received at the non-inverting input of the comparison circuit 204. The comparison circuit 204 compares signals received at the inverting and non-inverting terminals 212, 214 of the comparison circuit 204 to generate the comparison signal compQr 236. Thus, in instances where $V_{CC}$ 242 may fluctuate, both the DC offset of VauxOffset 244 and the DC voltage level of the comparison reference signal 246 will fluctuate correspondingly.

In this example, the AC component of the auxiliary signal 196 includes a series of oscillation ripples of a quasi-resonant waveform, whereby each oscillation ripple of the series of oscillation ripples has a peak point and valley point. It is appreciated by those of ordinary skill in the art that such oscillation ripples in the auxiliary signal 196 are the result of quasi-resonant oscillations at the drain 136 (i.e., $V_{DS}$) of the main switch 122. Such oscillations are caused by parasitic inductances and capacitances of the circuitry in the flyback converter 102.

In some embodiments, the voltage divider resistor 216 has a resistance value that is equal to a resistance value of the voltage divider resistor 222. Similarly, in such embodiments, the voltage divider resistor 218 has a resistance value that is equal to a resistance value of the voltage divider resistor 224. As such, a DC voltage value $V_{DC}$ of the comparison reference signal 246 is equal to a DC offset value $V_{DC}$ of the offset auxiliary signal 244. Moreover, an AC component of the offset auxiliary signal 244 alternates above and below $V_{DC}$ such that $V_{DC}$ may be considered a "zero-reference" for the offset auxiliary signal 244. As such, when the AC component of the offset auxiliary signal 244 transitions from a voltage level above $V_{DC}$ to a voltage level below $V_{DC}$ or from a voltage level below $V_{DC}$ to a voltage level above $V_{DC}$ the transition is considered a "zero-crossing."

The comparison circuit 204 compares the offset auxiliary signal 244 against the comparison reference signal 246 to produce the comparison signal compQr 236. The comparison signal compQr 236 is a digital signal that has a positive pulse (i.e., a digital 1) if the offset auxiliary signal 244 has a voltage value that is less than or equal to the comparison reference signal 246 and no pulse (i.e., a digital 0) if the offset auxiliary signal 244 has a voltage value that is greater than the comparison reference signal 246. The comparison signal compQr 236 is received by both the pulse-width LUT 228 and the logic circuit 234. In this example, pulses of the comparison signal compQr 236 have pulse-width durations that correspond to a half-period of the oscillation ripples of the offset auxiliary signal 244. This correspondence occurs because each pulse of the comparison signal compQr 236 pulse begins when the oscillation ripple causes the voltage value of the offset auxiliary signal 244 to drop to, or below, the comparison reference signal 246 (i.e., $V_{DC}$) and ends when the oscillation ripple causes the voltage value of the offset auxiliary signal 244 to rise above the comparison reference signal 246.

The pulse-width LUT 228 uses the pulse duration of the comparison signal compQr 236 to determine and store a duration of time corresponding to a quarter-period of the oscillation ripples of the offset auxiliary signal 244 (i.e., half of the half-period duration of the oscillation ripple). Each quarter-period of the offset auxiliary signal 244 corresponds to an estimated position of a voltage minimum (i.e., a valley) of the offset auxiliary signal 244 (i.e., a first valley, a second valley, a third valley, etc.)

The next time a valley is detected, in a subsequent switching cycle of the flyback converter 102, the logic circuit 234 sends a valley detection signal valley(n) 240 to the pulse-width LUT 228. The pulse-width LUT 228 transmits a delay value $\frac{1}{4}T_{QRperiod}(n)$ 238 to the logic circuit 234. After a duration of time corresponding to $\frac{1}{4}T_{QRperiod}(n)$ from the valley detection signal valley(n) 240, the logic circuit 234 transmits a valley point ("ValleyPoint") 198 signal to the mixed-signal controller 106 which switches the main switch 122 based on the valley point signal 198. Valley point detection is reset by the logic circuit 234 upon receiving a subsequent PWM signal 192. In some embodiments, if the quasi-resonant auto-tuning controller 104 determines that the main switch 122 of the flyback converter 102 has been exclusively switching at a first valley point of the quasi-resonant signal for a threshold number of previous switching cycles (e.g., 63 switching cycles, 127 switching cycles, 255 switching cycles, 511 switching cycles, etc.) of the flyback converter 102, the quasi-resonant auto-tuning controller 104 is operable to force the flyback converter 102 to switch at a second (or later) valley point of the quasi-resonant signal for one or more subsequent switching cycles to measure the quasi-resonant half-period. In some embodiments, determining, by the quasi-resonant auto-tuning controller 104, that the flyback converter 102 has been exclusively switching at a first valley point of the quasi-resonant signal for a threshold number of previous switching cycles of the flyback converter 102 is performed by the valley tuning finite-state machine 202. In some such embodiments, determining, by the quasi-resonant auto-tuning controller 104, that the flyback converter 102 has been exclusively switching at a first valley point of the quasi-resonant signal for a threshold number of previous switching cycles of the flyback converter 102 is performed by the combinational logic circuitry 234.

Turning to FIG. 3A, a plot 300 of an example auxiliary voltage $V_{aux}(t)$ 195 produced by the auxiliary-winding 150 is shown in accordance with the present disclosure. The plot 300 of the auxiliary voltage $V_{aux}(t)$ 195 is graphed as voltage versus time, where the plot 300 varies from a low voltage $-V_{in}/t_{vin}$ to a high voltage $V_{out}/tr_{aux}$, where $tr_{vin}$ is a primary-to-secondary turns ratio of the transformer 114, and $tr_{aux}$ is an auxiliary-to-secondary turns ratio of the transformer 114. In this example, auxiliary voltage $V_{aux}(t)$ 195 is shown to have a first valley point 310, a second valley point 312, a third valley point 313, a first peak 314, and a second peak 316. The oscillation ripples of the auxiliary signal 196 vary between the high voltage $V_{out}/tr_{aux}$ and a second low voltage $-V_{out}/tr_{aux}$. The first valley point 310 has a voltage value equal to $-V_{out}/tr_{aux}$. Because the oscillations of the auxiliary voltage $V_{aux}(t)$ 195 are damped, the subsequent oscillation ripples will have valley points that are greater than the second low voltage $-V_{out}/tr_{aux}$ and peaks that are less than the high voltage $V_{out}/tr_{aux}$.

In this example, the auxiliary voltage $V_{aux}(t)$ 195 starts at the low voltage $-V_{in}/t_{vin}$ that is less than 0 and then rises to high voltage $V_{out}/tr_{aux}$ after the main switch 122 is turned off. The auxiliary voltage $V_{aux}(t)$ 195 transitions across a 0V level at a first time $t_1$ and then drops to the second low voltage $-V_{out}/tr_{aux}$ by again crossing the 0V level at a second time $t_2$. The auxiliary voltage $V_{aux}(t)$ 195 reaches the second low voltage $-V_{out}/tr_{aux}$ at a third time t3 that corresponds to the first valley point 310. The auxiliary voltage $V_{aux}(t)$ 195 then rises again to approximately the high voltage $V_{out}/tr_{aux}$ by crossing the 0V level at a fourth time $t_4$. The auxiliary voltage $V_{aux}(t)$ 195 then drops again to the second valley point 312 by crossing the 0V level at a fifth time $t_5$. The auxiliary voltage $V_{aux}(t)$ 195 then rises again to a voltage below the high voltage $V_{out}/tr_{aux}$ by crossing the 0V level at a sixth time $t_6$. The auxiliary voltage $V_{aux}(t)$ 195 then drops again by crossing the 0V level at a seventh time $t_7$. At an eighth time $t_8$, the main switch 122 is turned on and the auxiliary voltage $V_{aux}(t)$ 195 returns to the low voltage $-V_{in}/t_{vin}$.

In FIG. 3B, a plot 336 of an example offset auxiliary signal VauxOffset 244 produced by the zero-voltage crossing detection circuit 200 is shown in accordance with the present disclosure. The plot 336 of the offset auxiliary signal VauxOffset 244 is graphed as a voltage versus time. As discussed earlier, the offset auxiliary signal VauxOffset 244 has the same waveform shape as the auxiliary voltage $V_{aux}(t)$ 195, though having an attenuated amplitude and a DC offset $V_{DC}$. As such, the offset auxiliary signal VauxOffset 244 varies above and below the DC offset $V_{DC}$ instead of above and below 0V. In this disclosure, the crossing of the DC offset $V_{DC}$ by the offset auxiliary signal VauxOffset 244 is still considered to be a zero-crossing because it corresponds to the actual zero-crossing of the auxiliary voltage $V_{aux}(t)$ 195 produced by the auxiliary-winding 150. In this example, the zero-crossings of the offset auxiliary signal 244 VauxOffset occur at the same times as the zero-crossings of the auxiliary voltage $V_{aux}(t)$ 195.

In FIG. 3C, a plot 340 is shown of an example comparison signal compQr 236 produced by the zero-voltage crossing detection circuit 200 in accordance with the present disclosure. The plot 340 of the comparison signal compQr 236 is graphed as a logic value (i.e., a digital 1 or 0) versus the same time span shown in FIGS. 3A and 3B. In this example, the comparison signal compQr 236 includes a first pulse 344, a second pulse 346, a third pulse 348, and a fourth pulse 350. The first pulse 344 corresponds to a comparison (by the comparison circuit 204) indicating that the offset auxiliary signal 244 is less than $V_{DC}$ before $t_1$. The second pulse 346 corresponds to a comparison indicating that the offset auxiliary signal 244 is less than $V_{DC}$ between $t_2$ and $t_4$. The third pulse 348 corresponds to a comparison indicating that the offset auxiliary signal 244 is less than $V_{DC}$ between $t_5$ and $t_6$, and the fourth pulse 350 corresponds to a comparison indicating that the offset auxiliary signal 244 is less than $V_{DC}$ after $t_7$. In this example, the second pulse 346 has a first pulse-width 352 that corresponds to a first half-period 354 of the first valley (shown in FIG. 3A) and the third pulse 348 has a second pulse-width 356 that corresponds to a second half-period 358 of the second valley (shown in FIG. 3A). In this example, the first quarter-period 360 corresponds to half of the first pulse-width 352, and the second quarter-period 362 corresponds to half of the second pulse-width 356. The first valley point 310 is located a first quarter-period 360 (i.e., a first divided pulse width) away from $t_2$ and the second valley point 312 is located a second quarter-period 362 (i.e., a second divided pulse width) away from $t_5$. In this example, the main switch 122 turns on at a third quarter-period 364 (at the third valley point 313) away from $t_7$.

Turning to FIG. 3D, a plot 366 of the valley point signal ("ValleyPoint") 198 produced by the quasi-resonant auto-tuning controller 104 is shown in accordance with the present disclosure. The plot 366 of the valley point signal 198 is graphed as a logic value (e.g., a digital 1 or 0) versus the same time span shown in FIGS. 3A through 3C.

The plot 366 of the valley point signal 198 shows a first pulse 370, second pulse 372, and third pulse 374. The three pulses 370, 372, and 374 are shorter than the three pulses 346, 348, and 350 for the comparison signal compQr 236 and start at the quarter-period times of the offset auxiliary signal VauxOffset 244. That is, the first pulse 370 starts at the first quarter-period 360 away from $t_2$, the second pulse 372 starts at the second quarter-period 362 away from $t_5$, and the third pulse 374 starts at the third quarter-period 364 away from $t_7$. As such, the first pulse 370, the second pulse 372, and the third pulse 374 correspond to the true first valley point 310, second valley point 312, and third valley point 313, respectively.

Figure 4:
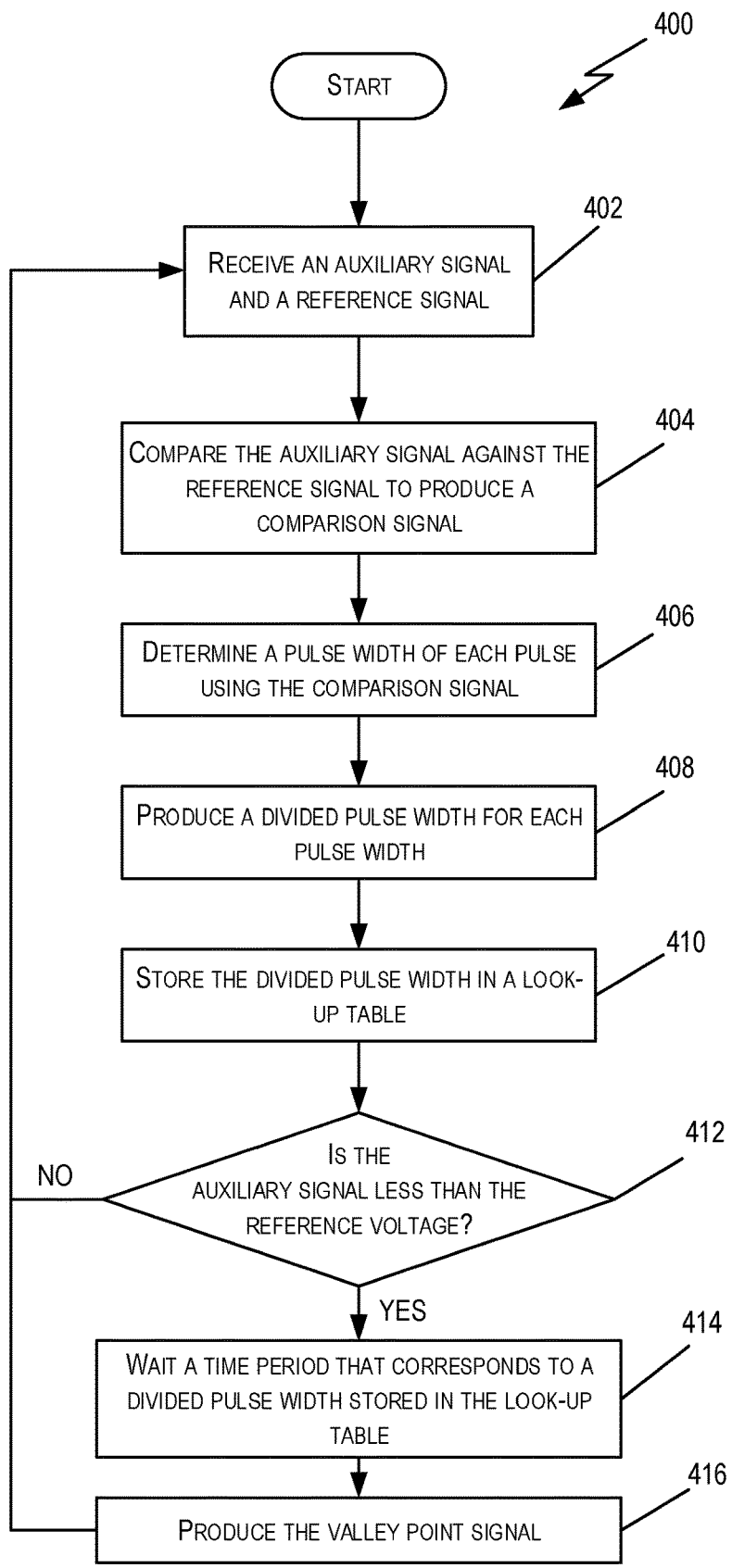
FIG. 4 is a flowchart illustrating a portion of an example process for operation of the quasi-resonant auto-tuning controller shown in FIGS. 1 and 2, in accordance with the present disclosure.

FIG. 4 is a flowchart illustrating a portion of an example process 400 of operation of the quasi-resonant auto-tuning controller 104 in accordance with the present disclosure. The process 400 starts by receiving 402 the offset auxiliary signal VauxOffset 244 from the auxiliary-winding 150 and the comparison reference signal 246. As discussed earlier, the offset auxiliary signal VauxOffset 244 includes a series of oscillation ripples (i.e., a quasi-resonant signal), where each oscillation ripple of the series of oscillation ripples has a peak point and valley point. The process 400 then compares 404 the offset auxiliary signal VauxOffset 244 against the comparison reference signal 246 to produce the comparison signal compQr 236 that includes a series of pulses when the offset auxiliary signal VauxOffset 244 is less than the comparison reference signal 246, where each pulse of the series of pulses has a pulse width that corresponds to a half-period of an oscillation ripple of the series of oscillation ripples. As discussed earlier, the offset auxiliary signal 244 is related to the auxiliary signal 196 with a DC offset $V_{DC}$ and gain/attenuation factor H. The process 400 then determines 406 the pulse width of each pulse of the series of pulses of the comparison signal compQr 236, produces 408 a divided pulse width from each pulse width, where the divided pulse width corresponds to a quarter-period of the oscillation ripple, i.e., half of the pulse width, and then stores 410 the divided pulse width of each pulse in the pulse-width LUT 228. In a subsequent switching cycle, the process 400 then determines 412, using the comparison signal, that the offset auxiliary signal 244 is less than the comparison reference signal 246 (i.e., another valley has been detected, for example in a subsequent switching cycle of the main switch 122). If the offset auxiliary signal 244 is not less than the comparison reference signal 246, the process 400 repeats steps 402 through 412. If, instead, the offset auxiliary signal 244 is less than the comparison reference signal 246 (i.e., corresponding to a desired valley during a subsequent switching cycle), the process 400 waits 414 a time period that corresponds to the quarter-pulse width stored in the pulse-width LUT 228. The process 400 then produces 416 the valley point signal 198 after waiting the time period and the process 400 repeats.

In this example, the step of producing 404 the comparison signal compQr 236 includes sub-steps that include removing the DC voltage from the auxiliary signal 196 with the series capacitor 210, adding the reference voltage to produce the offset auxiliary signal 244, and producing the comparison signal compQr 236 by comparing the offset auxiliary signal VauxOffset 244 against the comparison reference signal 246. As discussed earlier, the comparison signal compQr 236 includes the series of pulses indicating when the offset auxiliary signal VauxOffset 244 is less than the comparison reference signal 246. Furthermore, the step of determining 406 the pulse width includes counting a length of time that corresponds to the pulse width of each pulse of the series of pulses of the comparison signal compQr 236, where the length of time corresponds to the half-period of the oscillation ripple. Moreover, the step of producing 408 a divided pulse width includes dividing each pulse width by two to produce the divided pulse width, where the divided pulse width corresponds to the quarter-period of the oscillation ripple.

It is appreciated by those skilled in the art that the circuits, components, modules, and/or devices of, or associated with, the primary-side controller 100, the flyback converter 102, and the quasi-resonant auto-tuning controller 104 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic waveguides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described to best explain the principles of the examples, the practical application, and to enable others of ordinary skill in the art to understand the disclosure for various examples with various modifications as are suited to the particular use contemplated.

Moreover, reference has been made in detail to examples of implementations of the disclosed invention, one or more examples of which have been illustrated in the accompanying figures. Each example has been provided by way of explanation of the present technology, not as a limitation of the present technology. While the specification has been described in detail with respect to specific examples of implementations of the invention, it will be appreciated that those skilled in the art, upon attaining an understanding of the foregoing, may readily conceive of alterations to, variations of, and equivalents to these examples of implementations. For instance, features illustrated or described as part of one example of an implementation may be used with example of another implementation to yield a still further example of an implementation. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A quasi-resonant auto-tuning controller comprising:
   a zero-voltage crossing detection circuit; and
   a valley tuning finite-state machine having a look-up table;
   wherein the zero-voltage crossing detection circuit is configured to:
   receive a reference voltage;
   receive an auxiliary signal from an auxiliary winding of a flyback converter, wherein the auxiliary signal includes a plurality of oscillation ripples, and wherein each oscillation ripple of the plurality of oscillation ripples has a peak point and valley point; and
   produce a comparison signal that includes a plurality of pulses when the auxiliary signal is less than the reference voltage, wherein each pulse of the plurality of pulses has a pulse width that corresponds to a half-period of an oscillation ripple of the plurality of oscillation ripples; and
   wherein the valley tuning finite-state machine is configured to:
   determine the pulse width of each pulse of the plurality of pulses of the comparison signal;
   produce a divided pulse width from each pulse width, wherein the divided pulse width corresponds to a quarter-period of the oscillation ripple;
   store the divided pulse width of each pulse in the look-up table;
   determine, from the comparison signal, that the auxiliary signal is less than the reference voltage;
   wait a time period that corresponds to the divided pulse width stored in the look-up table if the auxiliary signal is less than the reference voltage; and
   produce a valley point signal after waiting the time period.

2. The quasi-resonant auto-tuning controller of claim 1, wherein:
   the zero-voltage crossing detection circuit includes a series capacitor;
   the zero-voltage crossing detection circuit is configured to remove a direct current ("DC") voltage from the auxiliary signal with the series capacitor and then add the reference voltage to produce an offset auxiliary signal;
   the zero-voltage crossing detection circuit produces the comparison signal by comparing the offset auxiliary signal against the reference voltage; and
   the comparison signal includes the plurality of pulses when the offset auxiliary signal is less than the reference voltage.

3. The quasi-resonant auto-tuning controller of claim 2, wherein:
   the zero-voltage crossing detection circuit includes a comparison circuit in signal communication with the series capacitor; and
   the comparison circuit is configured to receive the offset auxiliary signal and the reference voltage and produce the comparison signal.

4. The quasi-resonant auto-tuning controller of claim 3, wherein:
   the quasi-resonant auto-tuning controller is configurable to be in signal communication with a mixed-signal controller of the flyback converter;
   the mixed-signal controller receives the valley point signal; and
   the mixed-signal controller controls a main switch of the flyback converter based on the valley point signal.

5. The quasi-resonant auto-tuning controller of claim 4, wherein:
   upon determining, by the quasi-resonant auto-tuning controller, that the main switch has exclusively switched at a first valley point of the plurality of oscillation ripples for a threshold number of previous switching cycles of the flyback converter, the quasi-resonant auto-tuning controller is configured to force the flyback converter to switch the main switch at a second valley point of the plurality of oscillation ripples for one or more subsequent switching cycles.

6. The quasi-resonant auto-tuning controller of claim 4, wherein:
   the mixed-signal controller is configured to produce a pulse width modulated ("PWM") signal based on the valley point signal.

7. The quasi-resonant auto-tuning controller of claim 6, wherein:
   the mixed-signal controller is configurable to be in signal communication with a gate-driver for driving the main switch, the gate-driver being configured to receive the PWM signal and produce a gate-driver signal.

8. The quasi-resonant auto-tuning controller of claim 6, wherein:
   the quasi-resonant auto-tuning controller is configured to receive the PWM signal as a valley point detection reset signal.

9. The quasi-resonant auto-tuning controller of claim 1, wherein the valley tuning finite-state machine includes:
   a storage device that includes the look-up table; and
   a logic circuit configured to:
   determine the pulse width of each pulse of the plurality of pulses of the comparison signal;
   produce the divided pulse width from each pulse width;
   determine that the auxiliary signal is less than the reference voltage;
   wait the time period that corresponds to the divided pulse width stored in the look-up table if the auxiliary signal is less than the reference voltage; and
   produce the valley point signal after waiting the time period.

10. A method, comprising:
receiving a reference voltage;
receiving an auxiliary signal from an auxiliary winding of a flyback converter, wherein the auxiliary signal includes a plurality of oscillation ripples, and wherein each oscillation ripple of the plurality of oscillation ripples has a peak point and valley point;
producing a comparison signal that includes a plurality of pulses when the auxiliary signal is less than the reference voltage, wherein each pulse of the plurality of pulses has a pulse width that corresponds to a half-period of an oscillation ripple of the plurality of oscillation ripples;
determining the pulse width of each pulse of the plurality of pulses of the comparison signal;
producing a divided pulse width from each pulse width, wherein the divided pulse width corresponds to a quarter-period of the oscillation ripple;
storing the divided pulse width of each pulse in a look-up table;
determining, from the comparison signal, that the auxiliary signal is less than the reference voltage;
waiting a time period that corresponds to the divided pulse width stored in the look-up table if the auxiliary signal is less than the reference voltage; and
producing a valley point signal after waiting the time period.

11. The method of claim 10, wherein:
the divided pulse width of each pulse in the look-up table is stored within a storage device; and
determining the pulse width includes counting a length of time that corresponds to the pulse width of each pulse of the plurality of pulses of the comparison signal.

12. The method of claim 10, wherein:
producing the comparison signal includes:
removing a direct current ("DC") voltage from the auxiliary signal;
adding the reference voltage to produce an offset auxiliary signal; and
producing the comparison signal by comparing the offset auxiliary signal against the reference voltage; and
the comparison signal includes the plurality of pulses when the offset auxiliary signal is less than the reference voltage.

13. The method of claim 12, further comprising:
generating, by a mixed-signal controller of the flyback converter, a pulse width modulated ("PWM") signal; and
controlling, by the mixed-signal controller of the flyback converter, a main switch of the flyback converter using the PWM signal.

14. The method of claim 13, further comprising:
receiving the valley point signal at the mixed-signal controller of the flyback converter; and
controlling, by the mixed-signal controller, the main switch of the flyback converter based on the valley point signal.

15. The method of claim 14, wherein:
upon determining that the main switch has exclusively switched at a first valley point of the plurality of oscillation ripples for a threshold number of previous switching cycles of the flyback converter, forcing the flyback converter to switch the main switch at a second valley point of the plurality of oscillation ripples for one or more subsequent switching cycles.

16. A primary-side controller of a flyback converter having a main switch, the primary-side controller comprising:
a quasi-resonant auto-tuning controller in signal communication with an auxiliary winding, wherein the quasi-resonant auto-tuning controller is configured to produce a valley point signal from an auxiliary signal produced by the auxiliary winding;
a mixed-signal controller in signal communication with the quasi-resonant auto-tuning controller, wherein the mixed-signal controller is configured to receive the valley point signal and, in response, produce a pulse width modulated ("PWM") signal; and
a gate-driver for driving the main switch, wherein the gate-driver is in signal communication with the main switch and the mixed-signal controller, and wherein the gate-driver is configured to receive the PWM signal and produce a gate-driver signal.

17. The primary-side controller of claim 16, wherein:
the quasi-resonant auto-tuning controller is configured to receive the PWM signal as a valley point detection reset signal.

18. The primary-side controller of claim 16, wherein the quasi-resonant auto-tuning controller comprises:
a zero-voltage crossing detection circuit; and
a valley tuning finite-state machine having a look-up table;
wherein the zero-voltage crossing detection circuit is configured to:
receive the auxiliary signal and a reference voltage, wherein the auxiliary signal includes a plurality of oscillation ripples, and wherein each oscillation ripple of the plurality of oscillation ripples has a peak point and valley point; and
produce a comparison signal that includes a plurality of pulses when the auxiliary signal is less than the reference voltage, wherein each pulse of the plurality of pulses has a pulse width that corresponds to a half-period of an oscillation ripple of the plurality of oscillation ripples; and
wherein the valley tuning finite-state machine is configured to:
determine the pulse width of each pulse of the plurality of pulses of the comparison signal;
produce a divided pulse width from each pulse width, wherein the divided pulse width corresponds to a quarter-period of the oscillation ripple;
store the divided pulse width of each pulse in the look-up table;
determine, using the comparison signal, that the auxiliary signal is less than the reference voltage;
wait a time period that corresponds to the divided pulse width stored in the look-up table if the auxiliary signal is less than the reference voltage; and
produce the valley point signal after waiting the time period.

19. The primary-side controller of claim 18, wherein:
upon determining, by the quasi-resonant auto-tuning controller, that the main switch has exclusively switched at a first valley point of the plurality of oscillation ripples for a threshold number of previous switching cycles of the flyback converter, the quasi-resonant auto-tuning controller is configured to force the flyback converter to switch the main switch at a second valley point of the plurality of oscillation ripples for one or more subsequent switching cycles.

20. The primary-side controller of claim 18, wherein:

the zero-voltage crossing detection circuit includes a series capacitor;

the zero-voltage crossing detection circuit is configured to remove a direct current ("DC") voltage from the auxiliary signal with the series capacitor and then add the reference voltage to produce an offset auxiliary signal;

the zero-voltage crossing detection circuit produces the comparison signal by comparing the offset auxiliary signal against the reference voltage; and the comparison signal includes the plurality of pulses when the offset auxiliary signal is less than the reference voltage.

21. The primary-side controller of claim 20, wherein:

the zero-voltage crossing detection circuit comprises a comparison circuit in signal communication with the series capacitor; and the zero-voltage crossing detection circuit is configured to receive the offset auxiliary signal and the reference voltage and produce, using the comparison circuit, the comparison signal.

22. The primary-side controller of claim 18, wherein:

the valley tuning finite-state machine comprises:

a storage device that includes the look-up table; and a logic circuit configured to:

determine a length of time that corresponds to the pulse width of each pulse of the plurality of pulses of the comparison signal, wherein the length of time corresponds to the half-period of the oscillation ripple;

produce the divided pulse width from each pulse width, wherein the divided pulse width corresponds to the quarter-period of the oscillation ripple;

determine that the auxiliary signal is less than the reference voltage;

wait the time period that corresponds to the divided pulse width stored in the look-up table if the auxiliary signal is less than the reference voltage; and produce the valley point signal after waiting the time period.

23. The primary-side controller of claim 22, wherein:

the quasi-resonant auto-tuning controller, the mixed-signal controller, and the gate-driver are all integrated on a single integrated circuit.

* * * * *